United States Patent
Schaub et al.

(10) Patent No.: US 12,391,522 B2
(45) Date of Patent: Aug. 19, 2025

(54) OPERATING METHOD FOR A LOADING SYSTEM AND AUTOMATION SYSTEM FOR CONTROLLING THE LOADING SYSTEM

(71) Applicant: Siemens Aktiengesellschaft, Munich (DE)

(72) Inventors: Markus Schaub, Oberasbach (DE); Fabricio De Carvalho Ferreira, Erlangen (DE); Johannes Benkert, Fürth (DE); Bernd Wielens, Ahaus (DE); Janus Zirbs, Rugendorf (DE)

(73) Assignee: Siemens Aktiengesellschaft, Munich (DE)

( * ) Notice: Subject to any disclaimer, the term of this patent is extended or adjusted under 35 U.S.C. 154(b) by 163 days.

(21) Appl. No.: 18/369,269

(22) Filed: Sep. 18, 2023

(65) Prior Publication Data

US 2024/0095278 A1    Mar. 21, 2024

(30) Foreign Application Priority Data

Sep. 19, 2022 (EP) .................................... 22196372

(51) Int. Cl.
*B66C 13/00* (2006.01)
*B66C 13/46* (2006.01)
(Continued)

(52) U.S. Cl.
CPC ................ *B66C 13/46* (2013.01); *G06T 7/50* (2017.01); *G06T 2207/10028* (2013.01)

(58) Field of Classification Search
CPC .. B66C 13/46; G06T 7/50; G06T 2207/10028
(Continued)

(56) References Cited

U.S. PATENT DOCUMENTS

2006/0088188 A1*   4/2006   Ioffe ....................... G06T 7/254
                                                                                  348/135
2009/0222134 A1    9/2009   Franke et al.
(Continued)

FOREIGN PATENT DOCUMENTS

| CN | 101512452 | 8/2009 |
|----|-----------|--------|
| CN | 105893940 | 8/2016 |

(Continued)

OTHER PUBLICATIONS

Mukul Sarkar, "A biologically inspired collision detection algorithm using differential optic flow imaging," 2010, IEEE, whole article. (Year: 2010)*

(Continued)

*Primary Examiner* — Tiffany P Young
(74) *Attorney, Agent, or Firm* — Cozen O'Connor

(57) ABSTRACT

An automation system for controlling a loading system and operating method for the loading system which loads or moves a load along a route, wherein a collision between the load and objects in the environment during the loading process is avoided, where a digital load image file describing a spatial overall extent of the load is provided, an environment image file is recorded cyclically via an imaging sensor system, a protective distance is added to data of the load image file to provide a collision model image file, a cutout file is provided as a virtually recorded image file with a viewing angle from the load as a function of the route, a differential image file is provided from the collision model image file and the cutout file via differentiation, and an evaluation step is performed via which the differential image file is examined for a possible collision.

15 Claims, 5 Drawing Sheets

(51) Int. Cl.
*G06T 7/00* (2017.01)
*G06T 7/50* (2017.01)

(58) Field of Classification Search
USPC .......................................................... 701/301
See application file for complete search history.

(56) References Cited

U.S. PATENT DOCUMENTS

2021/0245295 A1  8/2021  Fahrni et al.
2022/0204319 A1  6/2022  Ladra et al.

FOREIGN PATENT DOCUMENTS

| | | |
|---|---|---|
| CN | 109977844 | 7/2019 |
| CN | 112740125 | 4/2021 |
| CN | 113379684 | 9/2021 |
| JP | 2006282337 | 10/2006 |
| JP | 2009155056 | 7/2009 |
| WO | 2014053703 | 4/2014 |
| WO | 2020221490 | 11/2020 |

OTHER PUBLICATIONS

Load Collision Prevention System, Improve safety while maximizing productivity, Siemens AG, 2 pages; 2018.

\* cited by examiner

OPERATING METHOD FOR A LOADING SYSTEM AND AUTOMATION SYSTEM FOR CONTROLLING THE LOADING SYSTEM

BACKGROUND OF THE INVENTION

1. Field of the Invention

The invention relates to an operating method for a loading system configured to load or move a load along a route, with which in order to avoid a collision between the load and objects in the environment, during the loading process, an environment image file is recorded cyclically via an imaging sensor system.

The invention also relates to an automation system configured to control a loading system for loading or moving a load along a route, comprising an imaging sensor system arranged to scan an environment, a sensor data computing unit configured to cyclically capture sensor data of the sensor system and to create an environment image file and a control unit configured for fault safety configured to control the loading system.

In the context of the invention, functional safety is understood to mean the concepts and specifications described in International Organization for Standardization (ISO) standard 13849-1. The standard DIN EN ISO 13849-1 "Sicherheit von Maschinen—Sicherheitsbezogene Teile von Steuerungen" [Safety of machinery—safety-related parts of control systems], sets specifications for the design of safety-related parts of controllers.

2. Description of the Related Art

Collisions of a load of a crane, where in particular ISO containers are considered to be a load, with the environment or surroundings, where in particular stacks of ISO containers are assumed here, or other obstacles, pose a problem with manually controlled cranes and also with automatically controlled cranes. Collisions may result in damage to the crane itself, to the load or to objects in the environment or the crane surroundings, but also in injury or death of persons. Crane operators therefore require equipment for avoiding and preventing collisions.

WO 2020/221490 A1 discloses a method for collision-free movement of a load with a crane.

SIMOCRANE Load Collision Prevention System (LCPS) by Siemens provides a solution for controlling loading systems. In such a system, a sensor node captures the crane environment with the aid of sensors (e.g., Radar, LIDAR, or ultrasound). A control node is responsible for the actual motion control of the crane. The sensor node creates two or three-dimensional maps of the crane environment from the sensor data. The sensor node determines the position of the load either by its own measurement with the aid of its sensors or it is communicated to it in another way. For collision detection, the sensor node continuously calculates whether objects in the crane environment violate a protected area around the load. Once the protected area is violated, the sensor node sends a stop signal to the control node. The control node has the control of the movement of the crane and in the event of an imminent collision, can now stop the crane as a function of the stop signal.

The control node is typically formed as a programmable logic controller (PLC). On account of the high demands on storage and computing power for the processing of the sensor data and storage of the map, the sensor node is generally an industry PC with corresponding high-performance software. The hardware currently used with the industry PC is not certified according to the valid safety criteria and the "Technischer Überwachungsverein," (TÜV) which translates to "Technical Inspection Association" would not permit such a system as a safety controller. The high demands on storage and computing power are due to the high-frequency and sometimes three-dimensional capture of the environment.

SUMMARY OF THE INVENTION

It is an object of the present invention to provide an operating method for a loading system, in which it is possible, despite the increased occurrence of data, to implement collision avoidance on a specially certified controller configured for functional fault safety.

This and other objects and advantages are achieved in accordance with the invention by an operating method for a loading system in which a digital load image file describing a spatial overall extent of the load is provided, an environment image file is cyclically recorded via an imaging sensor system, a protective distance is added to the data of the load image file and a collision model image file is therefore provided and a cutout file is provided as a virtually recorded image file with a viewing angle from a position of the load as a function of the route, where the cutout file is obtained as a reduced representation from the environment image file, a differential image file is provided from the collision model image file and the cutout file via differentiation, and an evaluation step is performed, where the differential image file is examined for a possible collision.

In the context of the invention, the following is understood from the term "from a position". The position could be a source or zero point in the load or any selected point in or on the load. This position need not necessarily lie in the center point, but it must be ensured that all components or computing methods involved have the same understanding of this position or the reference point.

The disclosed method of the invention advantageously avoids the problem of the sensor node requiring a lot of information from the control node and possibly even having to be adjusted in a project-specific manner. As a solution, it is proposed to move the collision calculation to the control node, the sensor node therefore transmits its view of the crane environment cyclically to the control node. From this reduced representation of the environment information, the control node can perform a collision calculation. The calculations required for this could therefore also be implemented on a safety controller, in particular an automation controller configured for functional fault safety, and would therefore be certifiable by a TÜV or other institutions.

A continuation of the method makes provision with the imaging sensor system to record a point cloud as an environment image file and from the point cloud to convert the cutout file as a data-reduced first depth image from the perspective of a virtual camera from a position of the load as a function of the route, where the collision model image file is present as a second depth image or is converted herein. Accordingly, a reduced depth image of the crane environment is obtained from an environment image file, which requires a very high quantity of data, with the aid of a "virtual camera" (cutout algorithm). Furthermore, a depth image of the load including a safety region of the load is now present. The present depth images can be subtracted from one another without an increased computing outlay. In a thus produced differential image, it is possible to identify whether a safety area or protected area is violated. With the depth images, each point describes a distance value. In the simplest case, this distance value is the distance between an object surface and the sensor. The first depth image shows the crane environment as a distance from a position of the load or a load recorder and is updated dynamically. The second depth image can represent the surface of the protected area, for instance, and therefore forms the protected area around the load from the same position. It is possible to dynamically adjust the protected area based on a driven speed.

To this end, an enveloping surface in the second depth image is adjusted dynamically about the protective distance.

With respect to an improved reaction time, the method provides that the differentiation for the provisioning of the differential image file from the collision model image file and the cutout file is not completed or the subtraction of the depth images starts in a focus area, since as soon as a first negative result exists, a collision statement can be made.

In order to achieve the best possible reaction time in the prediction of a possible collision, a differentiation can also begin in a focus area.

With a negative result, the protected area is violated and the crane reduces its speed or stops. With respect to the reaction time, a reaction to the collision avoidance can be initiated with the first negative result. With respect to a safety certification according to Safety Integrity Level (SIL) or performance (PL) level, the collision detection is very well suited according to this method, because this involves a simple arithmetic computing operation, i.e., subtraction, which can safely and quickly be made available as a certified function in a safety controller configured for functional safety.

With respect to the above-described nodes, such as the sensor node and the control node, the method is advantageously executed on a sensor data computing unit and a control unit. The load image file is provided during a commissioning of the loading system, the sensor data, which is determined via the imaging sensor system, is captured cyclically on a sensor data computing unit and stored as the environment image file. The cutout file is calculated as a reduced representation of the environment image file on the sensor data computing unit or on a further computing unit, the conversion of the cutout file into the first depth image is performed on the sensor data computing unit or on the further computing unit and the differentiation from the collision model image file and the cutout file is executed on a control unit configured for fault safety.

It is considered to be advantageous here for the collision calculation to be shifted onto the control node or onto the control unit. A collision calculation based on two-dimensional depth images can now be performed on the control node without effort.

In the context of the invention, there are two widespread forms of representation for a result of the stereoscopy or the recording of the image files. On the one hand, the point clouds and, on the other hand, depth images. A depth image is essentially the representation of a depth in a two-dimensional image via color coding. Here, a grayscale representation is in most cases selected, but an encoding similar to a thermal image camera is also used on occasion.

The depth images preferably have Cartesian coordinates that are scanned equidistantly. As a result of a known proximity in depth images, many evaluations can be performed more easily and 2D processing operations applied.

A container crane or a container bridge is advantageously used as a loading system and a container or a container including a load receiving means is used as a load.

The objects and advantages of the invention are also achieved by an automation system in which a digital load image file describing a spatial overall extent of the load is present in the control unit configured for fault safety, where the control unit configured for fault safety has a collision algorithm that is configured to add a protective distance to the data of the load image file in order thus to provide a collision model image file, the sensor data computing unit has a projector that is configured to provide a cutout file as a virtually recorded image file with a viewing angle from one position of the load as a function of the route, where the projector is configured to obtain the cutout file as a reduced representation from the environment image file, the collision algorithm is further configured to create a differential image file from the collision model image file and the cutout file by differentiation and an evaluator is present, which is configured to examine the differential image file for a possible collision.

In order to minimize the computing outlay on a control unit configured for fault safety, the imaging sensor system and the sensor data unit is configured to record a point cloud as an environment image file and furthermore the projector is configured to convert the cutout file, from the point cloud, as a data-reduced first depth image from the perspective of a virtual camera from a position of the load as a function of the route, where the collision model image file exists as a second depth image in the control unit designed for fault safety.

Furthermore, the control unit configured for fault safety has an adjuster, which is configured to dynamically adjust an enveloping surface area generated in the second depth image by the protective distance. A continuous adjustment of the safety regions during operation of a loading system is often required, because the design of the attachments may vary from system to system, and it is thus possible to react quickly to a system newly placed into operation. The dynamic adjustment of the protected area is also dependent on the speed with which the load is currently moved, therefore e.g. with a high speed, the protected area can be selected to be large and with a lower speed the protected area can be selected to be smaller, but external disturbances, e.g., a known uncertainty or a noise of the sensor can be taken into account.

With respect to a rapid reaction time, the collision algorithm has a focuser that is configured to begin the subtractions of the depth images in a focus area, in order to obtain the best possible reaction time with respect to the collision.

A differentiation for the provisioning of the differential image file from the collision model image file and the cutout file may not necessarily be completed. If the subtraction of the depth images starts in a particularly relevant focus area, then a stop signal can be output as soon as the differentiation supplies a negative result.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which.

DETAILED DESCRIPTION OF THE EXEMPLARY EMBODIMENTS

Figure 1:
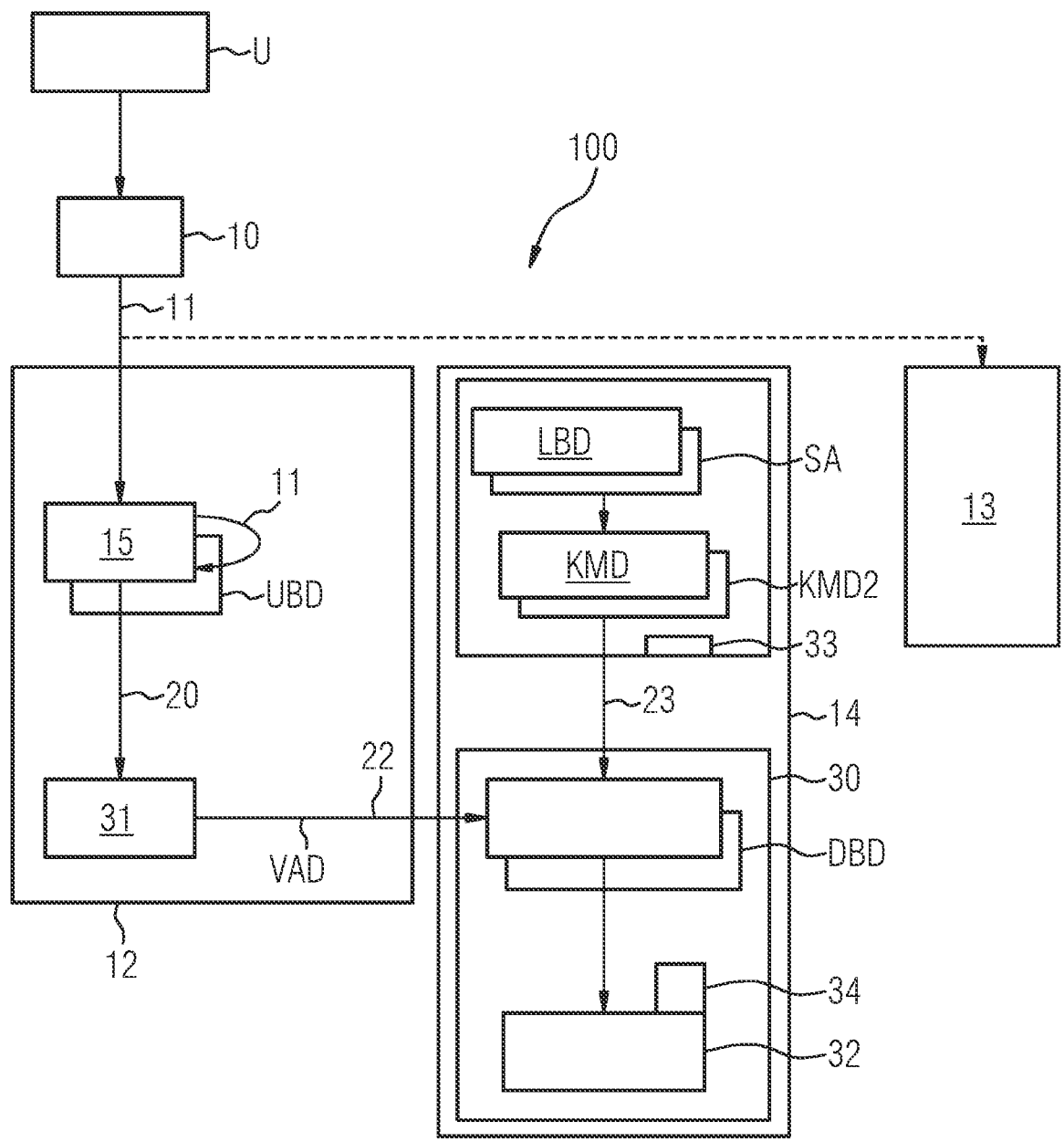
FIG. 1 shows a block diagram representation of an automation system in accordance with the invention.

FIG. 1 shown an automation system 100 is designed to control a loading system for loading or moving a load L along a route x. The automation system 100 is essentially divided into a sensor data computing unit 12 and a control unit 14, where the control unit 14 is a certified programmable logic controller configured for functional safety. According to the prior art, the problem was that extensive quantities of data of projection images could only be evaluated on a high-performance industry PC. The invention now advantageously proposes that only one cutout file is provided as a reduced representation from an environment image file UBD for a possible collision calculation on the control unit 14 of the control unit.

A point cloud 20 made from sensor data 11 is obtained from the real world U via an imaging sensor system C, such as LIDAR. This sensor data 11 is cyclically stored in a memory 15 of the sensor data computing unit 12 as the point cloud 20. The environment image file UBD is produced therefrom.

The control unit 14 configured for fault safety, in particular for functional fault safety, is basically configured to completely control the loading system. In accordance with the invention, a collision calculation is now also performed on the control unit 14 via a collision algorithm 30. The collision algorithm 30 implemented on the control unit 14 is configured to add a protective distance SA to the data of the load image file LBD and thus to provide a collision model image file KMD. For different systems, the control unit 14 can also have further collision model image files KMD2. The collision algorithm 30 is further configured to create a differential image file DBD from the collision model image file KMD and the cutout file VAD from the sensor data computing unit 12. The differential image file DBD obtained by the differentiation is examined for a possible collision of the load L with the environment U by means of an evaluation means 32.

The imaging sensor system 10 and the sensor data computing unit 12 are configured here to record the point cloud 20 as an environment image file U B D and further the projector 31 is configured, from the point cloud 20, to convert the cutout file VAD as a data-reduced first depth image 22 from the perspective of a virtual camera 24 (see FIG. 2) as a function of the route x. The collision model image file KMD is present in the control unit 14 configured for fault safety as a second depth image 23.

The conversion of the sensor data 11 or the recorded point cloud 20 into a depth image 22 need not necessarily occur in the sensor data computing unit 12, but can also occur in a further outsourced computing unit 13.

Figure 2:
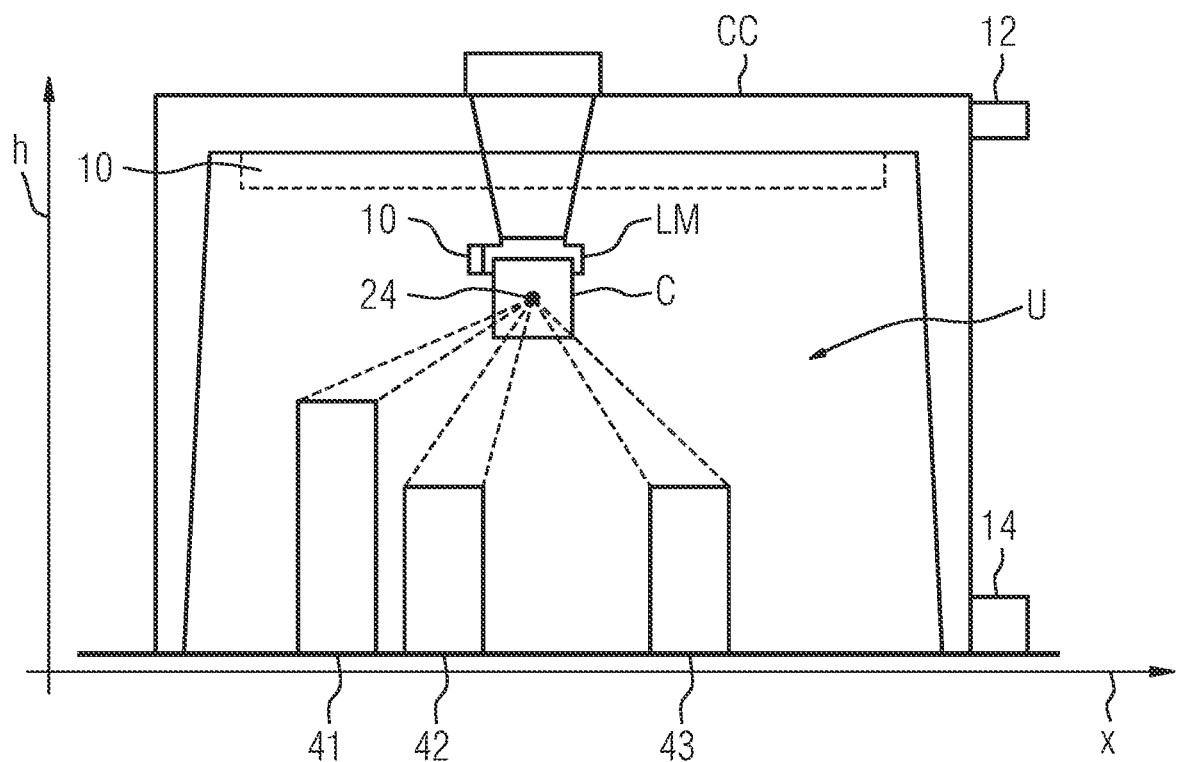
FIG. 2 shows a side view of a loading system (crane) in accordance with the invention.

The control unit 14 configured for fault safety further has an adjuster 33, which is configured to dynamically adjust an enveloping surface 26 generated in the second depth image 23 by the protective distance SA (see FIG. 2).

The control unit 14 configured for fault safety also has a focuser 34, which is embedded in the collision algorithm 30, for instance, and is configured to begin the subtraction of the first depth image 22 and the second depth image 23 in a focus area 28 to obtain the best possible (optimal) reaction time with respect to the collision or a statement relating to a future collision. This instant a negative result exists in the subtraction is a sign that the protected area SA is or will be violated and the control unit 14 can emit a speed reduction or a stop signal.

FIG. 2 shows a container crane CC with a container C as a load L, where the container C is held by a load receiver LM. The container crane CC can move a load L or the container C at a height h along a route x. The imaging sensor system 10 is installed on the container crane CC and on the load receiver LM and provides for a receipt of the environment U via the environment image file UBD. The sensor data 11, which the imaging sensor system 10 supplies, is forwarded to the sensor data computing unit 12. In accordance with the invention, in the sensor data computing unit 12 only a reduced image of the environment is now forwarded to the control unit 14 for a collision calculation. As a virtual camera 24, which forms a view from the origin of the container C, is used, only that section along the route via which the container C is also located is required from the environment image file UBD.

Figure 3:
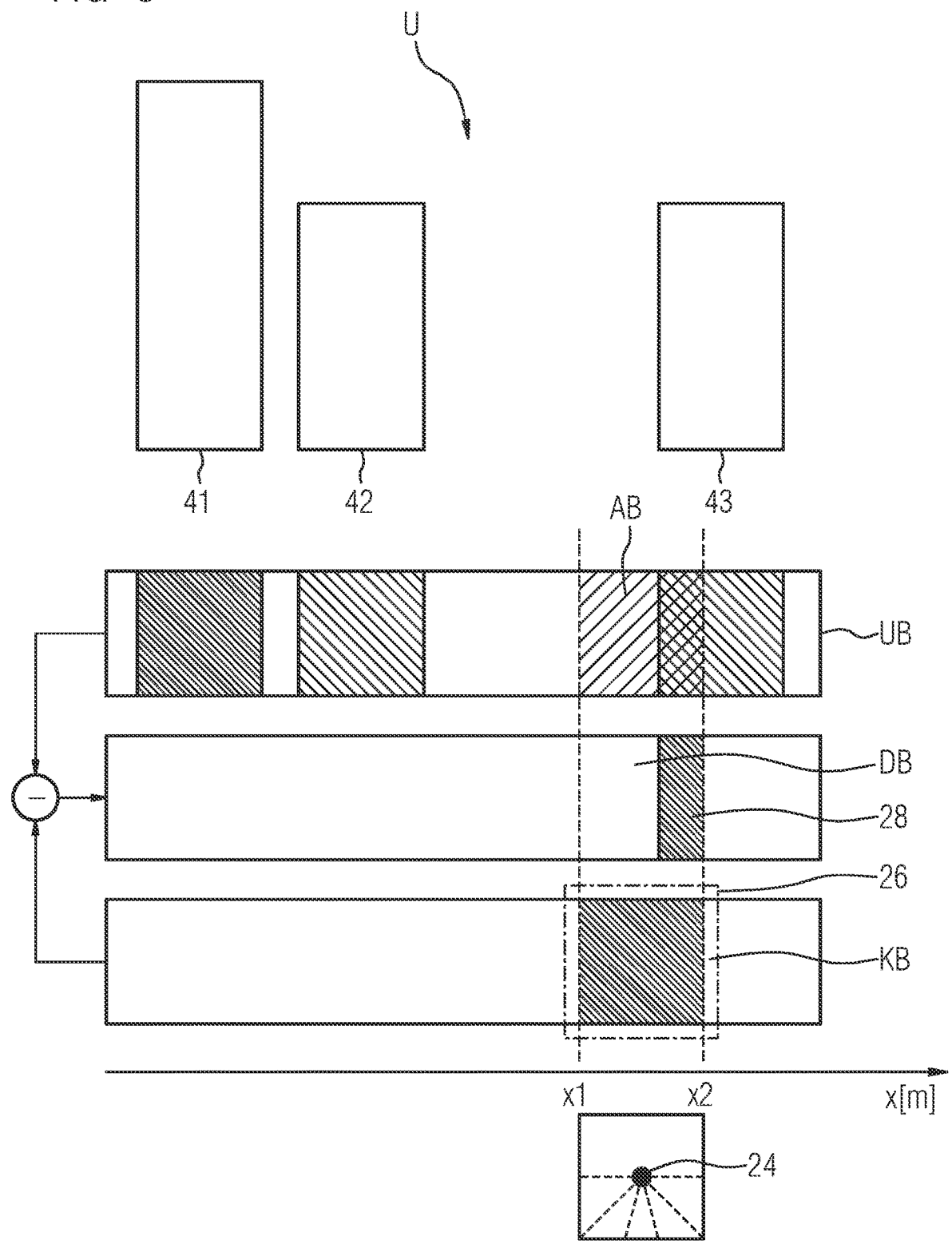
FIG. 3 shows a simplified representation of the environment with container stacks and simplified depth images from the bird's eye view in accordance with the invention.

To this end, FIG. 3 shows the explanation using simplified depth images from a bird's eye view of the environment. In the upper half of FIG. 3, a first container stack 41, a second container stack 42 and a third container stack 43 are shown by way of example. In the lower half of FIG. 3, the simplified depth images are shown as a collision image KB, an environment image UB, a cutout image AB and a differential image DB. The representation in the drawing is significantly simplified. In practice, spherical depth images are presumably used.

In a top view onto the container stack 41,42,43, the environment image UB represents this as black or gray surfaces. The collision image KB was generated from the collision model image file KMB as a second depth image 23. A generated enveloping surface 26 was added to the second depth image 23 by the protective distance SA. This enveloping surface 26 shows the protected area that is not permitted to be violated. The differential image DB specifies a negative result with the subtraction of the cutout image AB from the environment image UB and the collision image KB, so that the control unit 14 can evaluate that a collision is preferred and accordingly can reduce the speed or even send a stop signal.

If it is considered that in particular the edge regions of the container stack 41,42,43 may be hazardous for a collision, then a focus area 28 in which the subtraction is firstly begun could lie in an edge region of the container stack 41,42,43.

Figure 4:
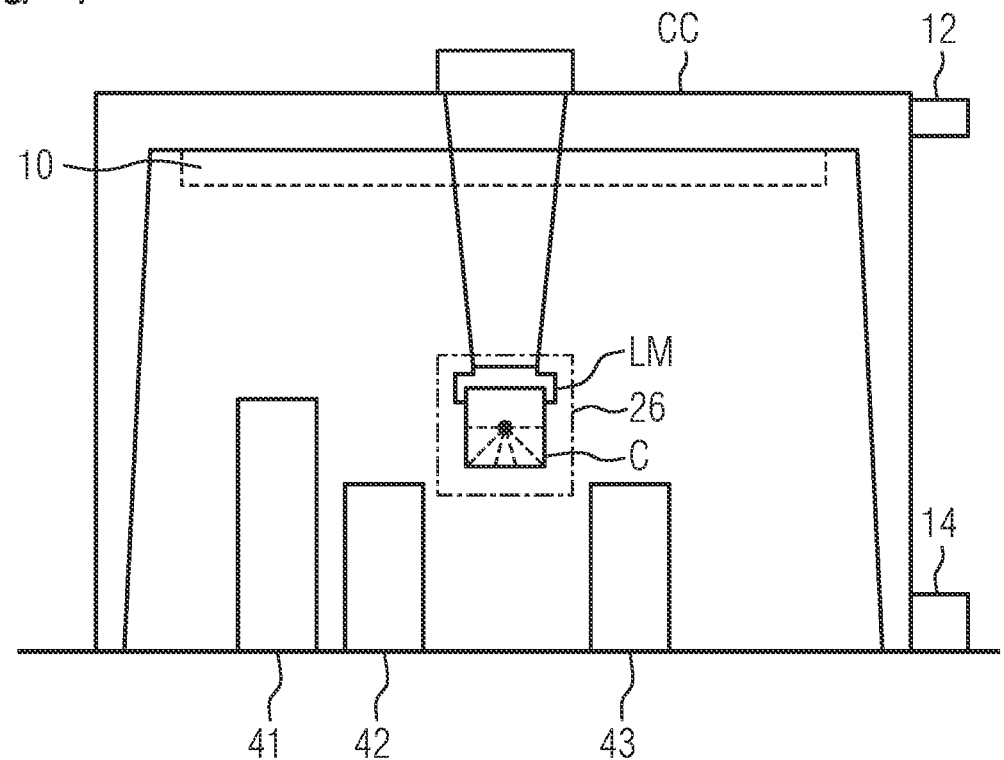
FIG. 4 shows a side view of the crane with a load and a protected area in accordance with the invention.

FIG. 4 shows by way of example the container crane CC, how it wants to position the container C with its load receiver LM between the second container stack 42 and the third container stack 43. With the differentiation in the collision algorithm 30 using the evaluation of the data images, it is calculated that the enveloping surface 26 is not touched. As a result, the container C can be positioned between the second container stack 42 and the third container stack 43 until the end.

Figure 5:
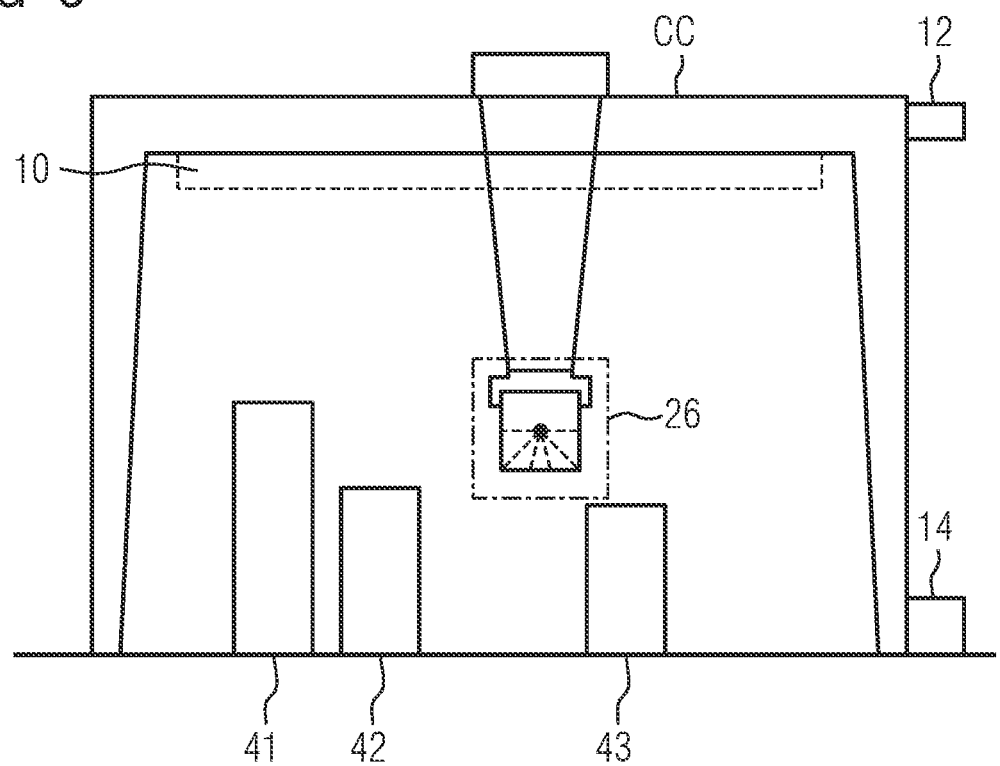
FIG. 5 shows the same side view of the crane of FIG. 4 with a load and a protected area, which is violated.

By contrast, FIG. 5 shows a positioning of the container C between the second container stack 42 and the third container stack 43, where the container C is aligned too far from the third container stack 43 and when the container C is moved further with the loading system, it would be indicated according to the collision algorithm 30 that the enveloping surface 26 is violated and the control unit 14 would thereupon emit a stop signal.

Figure 6:
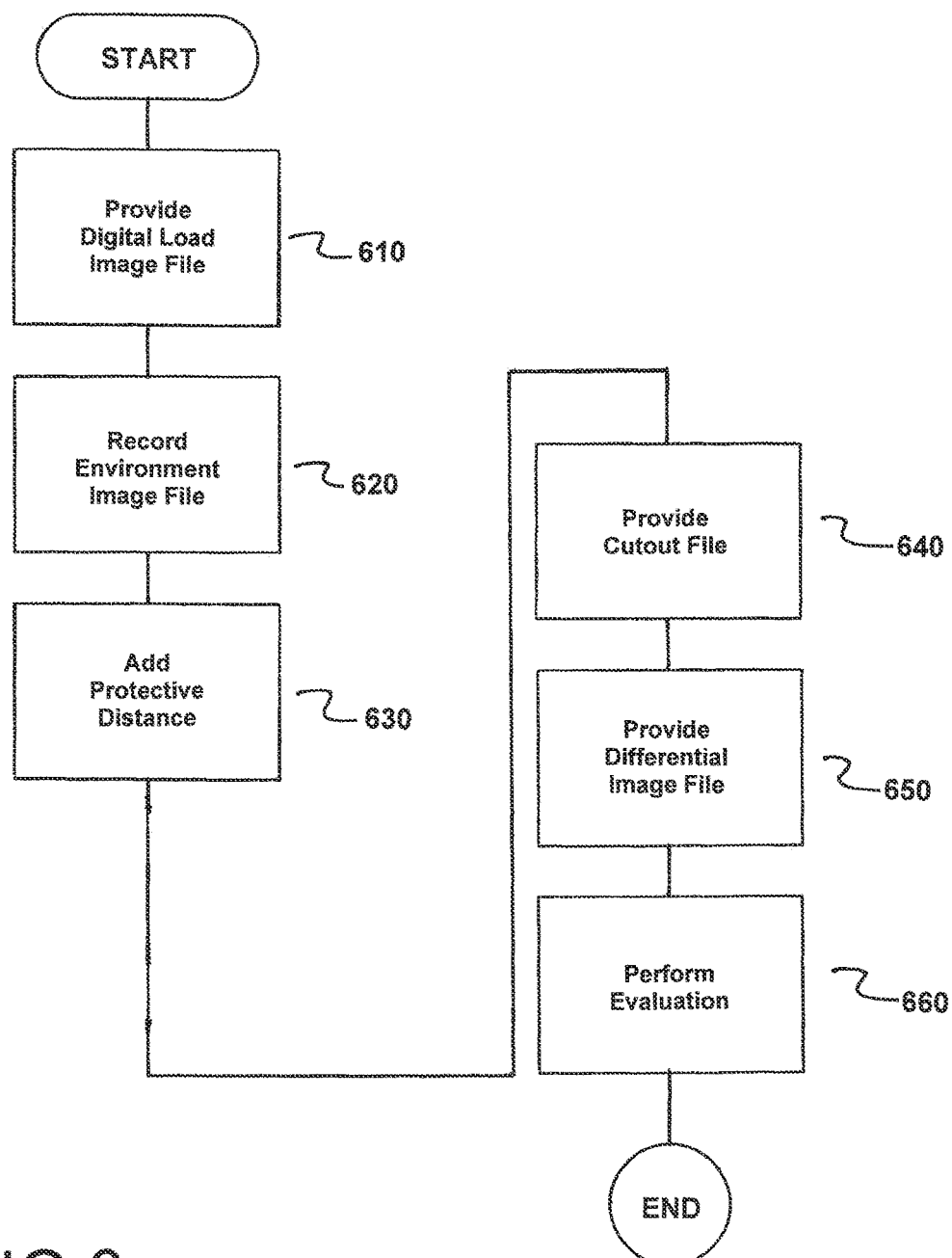
FIG. 6 is a flowchart of the method in accordance with the invention.

FIG. 6 is a flowchart of the operating method for a loading system which loads or moves a load L along a route x, where a collision between the load L and objects in the environment U being avoided during loading.

The method comprises providing a digital load image file LBD describing a spatial overall extent of the load L, as indicated in step 610.

Next, an environment image file UBD is recorded cyclically via an imaging sensor system 10, as indicated in step 620. Next, protective distance SA data of the load image file LBD is added to provide a collision model image file KMB, as indicated in step 630.

Next, a cutout file VAD is provided as a virtually recorded image file with a viewing angle from one position of the load L as a function of a route x, as indicated in step 640. In accordance with the method, the cutout file VAD is obtained as a reduced representation from the environment image file UBD.

Next, a differential image file DBD is provided from the collision model image file KMD and the cutout file VAD via differentiation, as indicated in step 650.

Next, an evaluation is performed by examining the differential image file DBD for a possible collision, as indicated in step 660.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An operating method for a loading system which loads or moves a load along a route, a collision between the load and objects in an environment being avoided during loading, the method comprising:
    providing a digital load image file describing a spatial overall extent of the load;
    recording an environment image file cyclically via an imaging sensor system;
    adding a protective distance to data of the load image file to provide a collision model image file;
    providing a cutout file as a virtually recorded image file with a viewing angle from one position of the load as a function of a route, the cutout file being obtained as a reduced representation from the environment image file;
    providing a differential image file from the collision model image file and the cutout file via differentiation; and
    performing an evaluation by examining the differential image file for a possible collision.

2. The operating method as claimed in claim 1, wherein a point cloud is recorded as an environment image file via the imaging sensor system and the cutout file is converted from the point cloud as a data-reduced first depth image from a perspective of a virtual camera from a position of the load as a function of the route; and wherein the collision model image file is present as a second depth image or is converted herein.

3. The operating method as claimed in claim 2, wherein an enveloping surface generated in the second depth image via the protective distance is adjusted dynamically.

4. The operating method as claimed in claim 1, wherein the differentiation for providing the differential image file from the collision model image file and the cutout file is not completed or subtraction of the depth images is started in a focus area due to a collision statement being obtainable as soon as a first negative result exists.

5. The operating method as claimed in claim 2, wherein the differentiation for providing the differential image file from the collision model image file and the cutout file is not completed or subtraction of the depth images is started in a focus area due to a collision statement being obtainable as soon as a first negative result exists.

6. The operating method as claimed in claim 3, wherein the differentiation for providing the differential image file from the collision model image file and the cutout file is not completed or subtraction of the depth images is started in a focus area due to a collision statement being obtainable as soon as a first negative result exists.

7. The operating method as claimed in claim 2, wherein the load image file is provided during commissioning of the loading system;
    wherein sensor data, which is determined via the imaging sensor system, is captured cyclically on a sensor data computing unit and stored as the environmental image file;
    wherein the cutout file is calculated as a reduced representation of the environment image file on the sensor data computing unit or on a further computing unit;
    wherein the conversion of the cutout file into the first depth image is performed on the sensor data computing unit or on the further computing unit; and
    wherein the differentiation from the collision model image file and the cutout file is performed on a control unit configured for fault safety.

8. The operating method as claimed in claim 3, wherein the load image file is provided during commissioning of the loading system;
    wherein sensor data, which is determined via the imaging sensor system, is captured cyclically on a sensor data computing unit and stored as the environmental image file;
    wherein the cutout file is calculated as a reduced representation of the environment image file on the sensor data computing unit or on a further computing unit;
    wherein the conversion of the cutout file into the first depth image is performed on the sensor data computing unit or on the further computing unit; and
    wherein the differentiation from the collision model image file and the cutout file is performed on a control unit configured for fault safety.

9. The operating method as claimed in claim 4, wherein the load image file is provided during commissioning of the loading system;
- wherein sensor data, which is determined via the imaging sensor system, is captured cyclically on a sensor data computing unit and stored as the environmental image file;
- wherein the cutout file is calculated as a reduced representation of the environment image file on the sensor data computing unit or on a further computing unit;
- wherein the conversion of the cutout file into the first depth image is performed on the sensor data computing unit or on the further computing unit; and
- wherein the differentiation from the collision model image file and the cutout file is performed on a control unit configured for fault safety.

10. The operating method as claimed in claim 1, wherein a container crane or a container bridge is utilized as a loading system and a container or a container including a load receiver is utilized as the load.

11. An automation system configured to control a loading system for loading or moving a load along a route, the system comprising
- an imaging sensor system arranged to scan an environment;
- a sensor data computing unit configured to cyclically capture sensor data of the sensor system and to create an environment image file;
- a control unit configured for fault safety and configured to control the loading system;
- wherein a digital load image file describing a spatial overall extent of the load is available in the control unit configured for fault safety;
- wherein the control unit configured for faulty safety has a collision algorithm, which is configured to add a protective distance to data of the load image file and provide a collision model image file;
- wherein the sensor data computing unit includes a projector, which is configured to provide a cutout file as a virtually recorded image file with a viewing angle from one position of the load as a function of the route, the projector being configured to obtain the cutout file as a reduced representation from the environment image file;
- wherein the collision algorithm is further configured to create a differential image file from the collision model image file and the cutout file via differentiation, and an evaluator is available, which is configured to examine the differential image file for a possible collision.

12. The automation system as claimed in claim 11, wherein the imaging sensor system and the sensor data computing unit are configured to record a point cloud as an environment image file;
- wherein the projector is further configured, from the point cloud, to convert the cutout file as a data-reduced first depth image from a perspective of a virtual camera from a position of the load as a function of the route; and
- wherein the collision model image file exists in the control unit configured for fault safety as a second depth image.

13. The automation system as claimed in claim 12, wherein the control unit configured for fault safety includes an adjuster, which is configured to dynamically adjust an enveloping surface generated by the protective distance in the second depth image.

14. The automation system as claimed in claim 11, wherein the collision algorithm include a focuser, which is configured to begin subtraction of depth images in a focus area to obtain a best possible reaction time with respect to the collision.

15. The automation system as claimed in claim 13, wherein the collision algorithm include a focuser, which is configured to begin subtraction of depth images in a focus area to obtain a best possible reaction time with respect to the collision.

* * * * *